United States Patent [19]
Sublett

[11] 4,330,670
[45] May 18, 1982

[54] COPOLYESTER ADHESIVES

[75] Inventor: Bobby J. Sublett, Kingsport, Tenn.

[73] Assignee: Eastman Kodak Company, Rochester, N.Y.

[21] Appl. No.: 267,102

[22] Filed: May 26, 1981

[51] Int. Cl.$^3$ ............................................. C08G 63/16
[52] U.S. Cl. .................................. 528/302; 528/305; 528/308; 528/309
[58] Field of Search ................ 528/302, 305, 308, 309

[56] References Cited

U.S. PATENT DOCUMENTS 3,654,232  4/1972  Jackson et al. ...................... 528/302
4,107,150  8/1978  Campbell et al. ................... 528/302
4,125,571  11/1978  Scott et al. ........................... 528/305

Primary Examiner—Lucille M. Phynes
Attorney, Agent, or Firm—John F. Stevens; Daniel B. Reece, III

[57] ABSTRACT

Copolyester adhesives are disclosed which are derived from 100 mole % of a dibasic acid component and 100 mole % of a glycol component, the dibasic acid component comprising at least 40 mole % of trans-1,4-cyclohexanedicarboxylic acid and the glycol component comprising at least 50 mole % 1,4-butanediol. The copolyester is characterized by having a melting point of about 40°–130° C., a glass transition temperature of about −20° C. to about 40° C., a heat of fusion of not less than 1.0 calorie per gram, and a crystalline half time of less than 10 minutes at maximum crystallization temperature. These copolyesters are useful as adhesives, and are especially useful as fusible interlining adhesives.

12 Claims, No Drawings

COPOLYESTER ADHESIVES

BACKGROUND OF THE INVENTION

1. Field of the Invention

This invention relates to certain copolyesters which have been found to be useful as adhesives, especially fabric interlining adhesives.

2. Description of Prior Art

A fusible interlining is a material such as fabric which has been coated on one side with a discontinuous pattern of fusible adhesive. When the interlining is bonded to a face fabric in a garment, it provides body and shape to the garment without impairing the ability of the fabric to breathe. Fusible interlinings are used, for example, in the manufacture of men's and women's suits, in shirt collars and cuffs, and in the waistbands of trousers. In the manufacture of suits, polycarbonate basting threads are frequently used to temporarily hold the parts of the suit in place. After the suit is completed, a solvent such as perchloroethylene or trichloroethylene is used to embrittle the polycarbonate thread so that it may be brushed from the fabric.

Certain polyesters are useful for fusible interlining applications. However, these polymers also tend to have certain disadvantages. For example, one polyester of interest is the copolyester of terephthalic acid, adipic acid, ethylene glycol and 1,4-butanediol as described in U.S. Pat. No. 3,699,921. Such polyesters tend to block in pellet form and fumed silica must be added in significant amounts to make it possible to grind this polymer into powder. Excessive amounts of fumed silica in the powder, however, prevent good coatability and good fusion of the powders on the fusible interlining fabric when applied with powder point applicators.

The use of polyesters with a melting point of 160° to 220° C. which are composed of terephthalic acid plus, in some cases, isophthalic acid and one or more glycols having 2 to 10 carbon atoms is disclosed in U.S. Pat. No. 3,853,665. Ethylene glycol, propylene glycol, butylene glycol, pentanediols or hexanediols are proposed as the glycols. As glycol mixtures, those mixtures are used which contain ethylene glycol, examples being ethylene glycol with 1,6 hexanediol or ethylene glycol with 1,4 butanediol. Such copolyesters have the disadvantage in that they have relatively high melting points. They are therefore usable to only a limited extent as coating substances to be applied in the molten state or as fusion adhesives for heat-sensitive materials.

Copolyesters generally have lower melting points than homopolyesters. For example, the melting point of a polyester of terephthalic acid and ethylene glycol is around 260° C. A polyester consisting of 90 mole % of terephthalic acid and 10 mole % of isophthalic acid in which ethylene glycol has been used as the diol component, has a melting point of 236° C. When the molar ratio of terephthalic acid to isophthalic acid is 80:20, a copolyester is obtained which has a melting point of 210° C. When the ratio of terephthalic acid to isophthalic acid is 70:30 the melting point drops to 185° C.

Conditions are similar when ethylene glycol is replaced by 1,4 butanediol. A polybutylene terephthalate comparable to polyethylene terephthalate has a melting point of 225° C.

In German "Offenelegunggaschrift" No. 1,920,432 there is disclosed a dry-cleaning fluid resistant polyester fusion adhesive prepared from (1) terephthalic acid and ethylene glycol, (2) adipic acid and 1,4-butanediol. The molar ratio of terephthalic acid to adipic acid ranges from a predominance of terephthalic acid to a predominance of adipic acid, and the molar ratio of ethylene glycol to 1,4-butanediol ranges from a predominance of ethylene glycol to a predominance of 1,4 butanediol. Such polyesters are used for bonding textiles. The copolyesters prepared in accordance with the patent has a softening point of 135° C. This softening point, however, is still too high for many heat-sensitive materials which are to be laminated or are to be provided with a melted or sintered coating such as artificial leather, natural leather. If the molar ratios of the individual components of these copolyesters are varied, it is possible to arrive at a copolyester having a softening point of 110° C. (terephthalic acid:adipic acid and molar ratio 60:40 with ethylene glycol:1,4 -butanediol ratio 60:40. The degree of crystallization of this copolyester, however, is already so low that it is not suitable for a fusion adhesive. Disadvantages reside in both the surface stickiness of the coated substrate and the stickiness of the copolyesters which is considerable even at room temperature. Copolyesters of this type are not suitable for the preparation of coating substances in powder form or adhesives in powder form such as required, for example, in the textile field.

It is well known in the art that the crystallinity of a polyester is one parameter which may be used to determine solvent resistance, i.e., the more amorphous (less crystalline), the more susceptible to dry-cleaning solvents the polyester will be. It is also known that the inherent property of glass transistion temperature is also a parameter by which the temperature at which a polyester, even an amorphous polyester, will be effected by a solvent.

It is also known that modification of a homopolyester by copolymerization with other acid or glycol moieties or combinations of glycol and acid moieties to form copolymers or terpolymers drastically reduces or eliminates crystallinity. The crystallinity of copolyesters is also dependent on the particular comonomers from which the copolyester is synthesized. For example, a polyester of terephthalic acid and 1,4 butanediol (even number of carbon atoms 4) will crystallize more readily than a polyester prepared from terephthalic acid and either 1,3 propanediol (odd number carbon atoms) or 1,5 pentanediol (odd number of carbon atoms). The crystallization phenomenon of copolyesters, especially those that are low melting, below 150° C., is unpredictable.

Amorphous polyesters cannot be used as fusion adhesives in which resistance to dry-cleaning agents and high set-up speed are required. In like manner, those polyesters are undesirable which have too little crystallinity, because they solidify too slowly and consequently do not lose their surface stickiness for days or in many cases even weeks.

Since the requirements of crystallinity, set-up time, melting point and resistance to dry-cleaning are so numerous and are so dependent on so many interrelated and unrelated inherent monomer and polymer properties it is impossible to precisely design or produce useful copolyesters for these applications.

Other low melting adhesives that we are aware of are those disclosed in U.S. Pat. No. 4,094,721 and U.S. Pat. No. 3,948,859.

DISCLOSURE OF THE INVENTION

In accordance with this invention, copolyesters suitable for use in applications where low melting adhesives are required and especially in fabric adhesive application, are provided.

These crystalline copolyester adhesive compositions are derived from 100 mole % of a dibasic acid component and 100 mole % of a glycol component, the dibasic acid component comprising at least 40 mole % of 1,4-cyclohexanedicarboxylic acid (DMCD) and the glycol component comprising at least 50 mole % 1,4-butanediol. The copolyesters are characterized by having a melting point of about 40°–130° C., a glass transition temperature of about −20° C. to about 40° C., a heat of fusion of not less than 1.0 calorie per gram, and a crystalline half time of less than 10 minutes at maximum crystallization temperature. The DMCD used in accordance with this invention has a trans-isomer content of at least 80%.

Besides having good adhesive properties, these copolyesters are low melting to provide resistance against scorching and sintering. They are resistant to dry-cleaning solvents, have good grindability, etc.

The copolyesters of the present invention are prepared by the condensation polymerization of at least one dibasic acid and at least one glycol. At least 40 mole percent of the acid moiety is a DMCD moiety. The acid component may contain up to 60 mol percent of one or more dicarboxylic acid moieties selected from moieties of isophthalic, succinic, adipic and glutaric acid. The glycol moieties comprise at least 50 mole percent 1,4-butanediol moiety. Up to 50 mole percent of the glycol moieties may be ethylene glycol or diethylene glycol moieties or mixtures thereof. Preferably, the mole percentages are about as follows: DMCD, 65 to 85; other dicarboxylic acid as specified above, 35 to 15; 1,4-butanediol, 65 to 85 and ethylene glycol or diethylene glycol, 35 to 15. The copolyesters should have an I.V. of about 0.4–1.2, a crystalline melting point of about 40°–130° C., preferably about 80°–115° C., and a glass transition temperature (Tg) of about −20° to about 40° C. The degree of crystallinity, measured by heat of fusion, $\Delta H_f$, should be greater than about 1.0 calorie per gram, preferably greater than about 3.0 calories per gram. The practical upper limit of $\Delta H_f$ is about 10 calories per gram. Also, the crystallization half time should be less than about 10 minutes at the maximum crystallization temperature.

Especially preferred are copolyesters derived from about 75 mole % DMCD, about 25 mole % glutaric acid, about 75 mole % 1,4-butanediol and about 25 mole % diethylene glycol.

The dicarboxylic acids and glycols specified for the copolyester are commercially available or they may be prepared by well known procedures. The copolyesters are prepared by reacting the acid or acids with the two glycol or glycols in a conventional manner well known in the art.

The crystalline melting point, $\Delta H_f$, and $T_g$ referred to above are measured by conventional means using a Differential Scanning Calorimeter.

Ester forming derivatives of the acids referred to herein can be employed, if desired, to prepare the copolyesters of this invention. Examples of such ester forming derivatives are the acids, anhydrides, esters and ester chlorides of such acids.

These copolyesters are readily put into powder form using conventional grinding techniques, preferably by cryogenic grinding. The powders are nonblocking and can be readily applied to fusible interlining fabrics from powder point applicators, from random sprinkling equipment, or in the form of a paste. The particles are finely divided, i.e., from about 1 micron to about 500 microns. In the application of powders from powder point applicators, it is desirable to have powders with a particle size range of 50–200 microns (270–70 mesh). For random sprinkling application on tightly woven or nonwoven fabrics, particle size of 150–300 microns (100–50 mesh) is desirable. For random sprinkling on open-weaver fabrics such as cheap rayon/cotton blends, powders with 300–500 micron size (50–35 mesh) are required. For application of powder in paste form, it is necessary to have very fine powders. For example, in paste form, powder size should be 1–80 micron (less than 200 U.S. mesh). The copolyesters may also be used in film or powder form.

The hot melt adhesives according to this invention are especially desirable because of their good grindability, i.e., ability to be ground into a finely divided, free-flowing powdery form by conventional grinding techniques, and their resistance to blocking or caking during storage.

The "heat of fusion", $\Delta H_f$, of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

One of the commonly used parameters for describing the crystallization rate of a polymer is the crystallization half-time, $t_{\frac{1}{2}}$. The crystallization half-time is simply the time at which the crystallization of the originally amorphous sample is half completed according to the method used to monitor crystallinity and may be determined in conventional manners. The half-time is strongly dependent on the crystallization temperature.

One way of determining the isothermal crystallization of a polymer is an approximation described by the Avrami equation $$X = X_o (1 - e^{-(t/\tau)^n}) \quad (1)$$

where $X_o$ is the limiting value of the crystallinity, X is isothermal crystallization, $t_p$ is the time required to reach the peak of crystallization exotherm and is a characteristic time determined by the polymer and the crystallization temperature, and n is the so-called Avrami exponent, generally in the range 2.0 to 3.5. The reduced crystallization half-time, $(t/\tau)_{\frac{1}{2}}$, is obtained by solving $$\frac{X}{X_o} = \frac{1}{2} = 1 - e^{-(\frac{t}{\tau})^n_{\frac{1}{2}}} \text{ to get} \quad (2)$$

$$\left(\frac{t}{\tau}\right)_{\frac{1}{2}} = \sqrt[n]{\ln 2} \quad (3)$$

The DSC response obtained would be described by differentiating equation (1) with respect to time to get $$\frac{dX}{dt} = X_o \frac{n}{\tau} \left(\frac{t}{\tau}\right)^{n-1} e^{-(\frac{t}{\tau})^n} \quad (4)$$

This function has a maximum for all $n > 1$. Differentiating equation 4 with respect to time, setting the derivative equal to zero and solving for $t/\tau$, one finds the maximum of $dX/dt$, which is the peak of the DSC curve, to be located at $$\frac{t_p}{(\tau)} = \sqrt[n]{\frac{n-1}{n}} \quad (5)$$

The ratio of $t_{p/(\tau)}$ to $(t/\tau)_{\frac{1}{2}}$, $$\frac{(t_p)}{\left(\frac{t}{\tau}\right)_{\frac{1}{2}}} = \frac{t_p}{t_{\frac{1}{2}}} = \sqrt[n]{\frac{n-1}{n \ln 2}} \quad (6)$$

the ratio $t_p/(t_{\frac{1}{2}})$ is between 0.85 and 1.04 for $n > 2$. The curve of $t_p$ vs. crystallization temperature is a sufficient approximation of the curve $t_{\frac{1}{2}}$ vs. crystallization temperature.

When copolyesters prepared as described above are employed as melt adhesives to laminate various fabric systems, metal strips and the like, excellent bonds results. These bonds are found to be highly resistant to the action of dry cleaning solvents such as perchloroethylene. The strength of the bonds is determined by a peel test based on the ASTM "T-Peel Test" set forth on pages 63 and 64 of the 1964 edition of the BOOK OF ASTM STANDARDS, published by the American Society for Testing Materials, and more specifically identified as Test Number D-1876-61-T. Results are averages of three specimens.

If desired, dyes or dye receptive agents, color stabilizers and various other adjuvants may be added to the copolyester adhesives to meet certain specific end use requirements. Such additives would normally be added as such to the polymerization mixture in which the copolyester is produced.

As used herein, the inherent viscosity (I.V.) is measured at 25° C. using 0.50 gram of copolyester per 100 ml. of a solvent consisting of 60 percent by weight phenol and 40 percent by weight tetrachloroethane.

The following examples are submitted for a better understanding of the invention.

EXAMPLES

A typical copolyester prepared in accordance with this invention is as follows. One hundred grams of trans-dimethyl 1,4-cyclohexanedicarboxylate (0.45 moles), 9.7 grams (0.05 moles) of dimethylisophthalate, 63 grams (0.7 moles) of 1,4-butanediol, 31.8 grams (0.3 moles) of diethylene glycol, and 1 mL of n-butanol solution of titanium tetraisopropoxide which is 1.24% titanium are weighed into a 500 mL single-neck round-bottom flask equipped with a nitrogen inlet, stirrer, vacuum outlet, and a condensing flask. The flask is heated at 200° C. in a Belmont metal bath for three hours with a nitrogen sweep over the reaction mixture. When the theoretical amount of methanol has distilled from the reaction mixture, the metal bath temperature is increased to 260° C. and the pressure in the flask reduced to 0.5 to 0.1 mm of mercury. The flask is heated at 260° C. at a reduced pressure of 0.5 to 0.1 mm of mercury for one hour. The flask is then removed from the bath and allowed to cool as the polyester crystallizes. Gas chromatographic analysis of the polyester reveals the copolyester contains the following mole percent of the reaction residues: trans dimethyl 1,4-cyclohexanedicarboxylate, 80 mole %; dimethylisophthalate, 20 mole %; 1,4-butanediol, 80 mole %; diethylene glycol, 20 mole %.

The copolyester has an inherent viscosity of 0.85 and a crystalline melting point of 115° C. This copolyester is an excellent fabric adhesive.

The polyester adhesives, prepared as described in the general and specific example above, are cryogenically ground and screened to obtain a powder that passes a 70 mesh screen. The powders are applied from an engraved roll to a cotton interlining fabric to form an interlining containing rows of adhesive dots across the interlining fabric. The interlining is used to bond two different face fabrics, wool/polyester and polyester/cotton. The interlinings are bonded to face fabrics by pressing four-inch squares of interlining to four-inch squares of face fabrics using either steam or an electric press. The bonded fabrics are laundered and dry-cleaned, then cut into strips one inch wide and T-peel strength determined before and after dry-cleaning. The T-peel strengths reported are an average of three determinations per sample.

Examples of copolyester adhesives that are useful as low-melting, partially crystalline, resistant to dry-cleaning, have good adhesion to a variety of fabrics, and have rapid crystallization rates are shown in Table 1 in Examples 1 through 7. The examples show that copolyesters based on trans dimethyl 1,4-cyclohexanedicarboxylate and a second acid moiety with the major glycol being 1,4-butanediol and containing minor portions of either diethylene glycol or ethylene glycol (Examles 1 through 4 and 6 and 7), are grindable into powder, have rapid crystallization rates, and have sufficient crystallinity, insolubility in dry-cleaning solvents and low temperature bonding characteristics which make them useful as fabric adhesives. Example 5 shows an excellent fabric adhesive prepared from a 60/40 mixture of 1,4-butanediol/diethylene glycol trans dimethyl 1,4-cyclohexanedicarboxylate exclusively as the acid component.

Example 8 shows a low melting partially crystalline adhesive based on 70/30 cis/trans 1,4-cyclohexanedicarboxylate, 1,4-butanediol, and diethylene glycol which has sufficient crystallinity, but is not dry-cleanable and has too slow crystallization rate. The copolyester is tacky and has very poor grinding characteristics.

Examples 9 and 10 are examples of copolyesters based on trans dimethyl 1,4-cyclohexanecarboxylate, 1,4-butanediol, ethylene glycol and diethylene glycol which are partially crystalline, but are tacky, nondry-cleanable and have poor grinding characteristics. Examples 11 and 12 are low-melting, partially crystalline copolyesters based on terephthalic acid and ethylene glycol (Example 11) and terephthalic acid and 1,4-butanediol (Example 12) which are tacky, slow crystallizing, nondry-cleanable, and have poor grinding characteristics. Example 13 is a copolyester prepared, ground into powder, and used to make an interlining which is tested as a fabric adhesive after bonding to a polyester/cotton face fabric. The copolyester will bond at low temperature (110° C.) has excellent grindability, crystallinity, crystallization rate, and is an excellent fabric adhesive. This copolyester illustrates the uniqueness of constructing a copolyester with the combined good characteristics of adhesion, crystallinity, resistance to dry-cleaning and crystallization rate to make a useful fabric adhesive. This copolyester is unique in exhibiting the right combination of properties. Example 14 is a copolyester low melting fabric adhesive containing 1,4-butanediol as the only glycol source and more than 40 mole % of trans dimethyl 1,4-cyclohexanedicarboxylate as the acid source for the copolyester. This copolyester meets all of the criteria for a low-melting fusible interlining adhesive. Example 15 is copolyester which is made up of trans 1,4-cyclohexanedicarboxylate as the major acid component and 1,4-butanediol as the major glycol component, although this polyester is modified with 30 mole % dimethyl terephthalate and 20 mole % ethylene glycol. It does not show the melting point depression of the other copolyesters based on poly(butylene trans 1,4-cyclohexanedicarboxylate) which are modified with the second acids and glycols described in this invention. This copolyester has all the properties required for a good fabric adhesive except it melts too high (143° C.) to be bondable at low temperatures. This example further shows the importance of the selection of the right monomers to prepare copolyesters with specific properties, but this copolymer would have been predicted to have a much lower crystalline melting point.

TABLE 1

| Example No. | 1 | 2 |
|---|---|---|
| Molar proportions of acid and glycol components in copolyesters | 80% trans 1,4-cyclohexane-dicarboxylic acid<br>20% isophthalic acid<br>80% 1,4-butanediol<br>20% diethylene glycol | 80% trans 1,4-cyclohexane-dicarboxylic acid<br>20% glutaric acid<br>80% 1,4-butanediol<br>20% ethylene glycol |
| Inherent viscosity | 0.74 | 1.1 |
| $\Delta H_f$ cal/g (DSC) | 4.70 | 3.77 |
| T-peel strength at 23° C. lb/in. | 3.0 | 2.6 |
| T-peel strength after dry cleaning (5 cycles) lb/in. | 2.9 | 2.5 |
| Melting point (DSC) °C. | 117 | 116 |
| Bonding temperature °C. | 110 | 110 |
| Type failure | None | None |
| Grindability | Excellent | Excellent |
| Coating weight g/yd$^2$ | 18 | 18 |
| Crystallization half time | 4.1 min. at 60° C. | 0.4 min. at 40° C. |
| Example No. | 3 | 4 |
| Molar proportions of acid and glycol components in copolyester | 75% trans dimethyl 1,4-cyclohexanedicarboxylate<br>25% adipic acid<br>80% 1,4-butanediol<br>20% diethylene glycol | 100% trans dimethyl 1,4-cyclohexanedicarboxylate<br>10% succinic acid<br>70% 1,4-butanediol<br>30% ethylene glycol |
| Inherent viscosity | 0.95 | 0.85 |
| $\Delta H_f$ cal/g (DSC) | 4.61 | 5.0 |
| T-peel strength at 23° C. lb/in. | 2.3 | 2.5 |
| T-peel strength after dry cleaning (5 cycles) lb/in. | 2.1 | 2.5 |
| Melting point (DSC) °C. | 114 | 119 |
| Bonding temperature °C. | 110 | 110 |
| Type failure | None | None |
| Grindability | Excellent | Excellent |
| Coating weight g/yd$^2$ | 16 | 16.5 |
| Crystallization half time min. | 0.25 min. at 25° C. | 0.2 min. at 25° C. |
| Example No. | 5 | 6 |
| Molar proportions of acid and glycol components in copolyester | 100% trans 1,4-cyclohexane-dicarboxylate<br>60% 1,4-butanediol<br>40% diethylene glycol | 75% trans dimethyl 1,4-cyclohexane-dicarboxylate<br>25% dimethyl isophthalate<br>80% 1,4-butanediol<br>20% ethylene glycol |
| Inherent viscosity | 0.69 | 0.78 |
| $\Delta H_f$ cal/g (DSC) | 4.22 | 2.77 |
| T-peel strength at 23° C. lb/in. | 2.5 | 2.3 |
| T-peel strength after dry cleaning (5 cycles) lb/in. | 2.2 | 2.1 |
| Melting points (DSC) °C. | 102 | 98 |
| Bonding temperature °C. | 115 | 110 |
| Type failure | None | None |
| Grindability | Excellent | Excellent |
| Coating weight g/yd$^2$ | 20 | 22 |
| Crystallization half time | 2.5 min. at 60° C. | 3 min. |
| Example No. | 7 | 8 |
| Molar proportions of acid and glycol components in copolyester | 75% trans 1,4-cyclohexane-dicarboxylate<br>25% dimethyl isophthalate<br>75% 1,4-butanediol<br>25% diethylene glycol | 100% 70/30 cis/trans dimethyl 1,4-cyclohexanedicarboxylate<br>80% 1,4-butanediol<br>20% diethylene glycol |
| Inherent viscosity | 0.78 | 0.64 |
| $\Delta H_f$ cal/g (DSC) | 3.55 | 2.0 |
| T-peel strength at 23° C. lg/in. | 2.3 | 2.3 |
| T-peel strength after dry cleaning | | |

TABLE 1-continued

| | | |
|---|---|---|
| (5 cycles) lb/in. | 2.2 | 0.1 |
| Melting point (DSC) °C. | 110 | 92 |
| Bonding temperature °C. | 110 | 110 |
| Type failure | None | Tacky, dry clean |
| Grindability | Excellent | Poor |
| Coating weight g/yd$^2$ | 16 | 16 |
| Crystallization half time | 4.5 min. | >20 min. |
| Example No. | 9 | 10 |
| Molar proportions of acid and glycol components in copolyester | 100% trans dimethyl 1,4-cyclohexanedicarboxylate<br>45% 1,4-butanediol<br>55% ethylene glycol | 100% trans dimethyl 1,4-cyclohexanedicarboxylate<br>45% 1,4-butanediol<br>55% diethylene glycol |
| Inherent viscosity | 0.78 | 0.82 |
| $\Delta H_f$ cal/g (DSC) | 1.0 | <1 |
| T-peel strength at 23° C. lb/in. | 2.5 | 2.4 |
| T-peel strength after dry cleaning (5 cycles) lb/in. | 0 | 0.1 |
| Melting point (DSC) °C. | 98° C. | 91 |
| Bonding temperature °C. | 110 | 110 |
| Type failure | Tacky, dry clean | Tacky, dry clean |
| Coating weight g/yd$^2$ | 18 | 18 |
| Grindability | Poor | Poor |
| Crystallization half time | >15 min. | >15 min. |
| Example No. | 11 | 12 |
| Molar proportions of acid and glycol components in copolyester | 50% dimethyl terephthalate<br>50% adipic acid<br>100% ethylene glycol | 50% terephthalic acid<br>20% isophthalic acid<br>30% azealic acid<br>100% 1,4-butanediol |
| Inherent Viscosity | 0.78 | 0.84 |
| $\Delta H_f$ cal/g (DSC) | 1.2 | 1.45 |
| T-peel strength at 23° C. lb/in. | 2.1 | 2.0 |
| T-peel strength after dry cleaning (5 cycles) lb/in. | 0.4 | 0.3 |
| Melting point (DSC) °C. | 110 | 115 |
| Bonding temperature °C. | 110 | 110 |
| Type failure | Tacky, dry clean failure | Tacky, dry clean failure |
| Grindability | Poor | Poor |
| Coating weight g/yd$^2$ | 21 | 19 |
| Crystallization half time | >20 min. | >15 min. |
| Example No. | 13 | 14 |
| Molar proportions of acid and glycol components in copolyester | 84% terephthalic acid<br>16% isophthalic acid<br>60% 1,6-hexanediol<br>40% 1,4-butanediol | 100% trans 1,4-cyclohexane-dicarboxylate<br>35% glutaric acid<br>100% 1,4-butanediol |
| Inherent Viscosity | 0.64 | 0.79 |
| $\Delta H_f$ cal/g (DSC) | 3.86 | 4.9 |
| T-peel strength at 23° C. lb/in. | 2.1 | 2.5 |
| T-peel strength after dry cleaning (5 cycles) lb/in. | 1.9 | 2.4 |
| Melting point (DSC) °C. | 112 | 117 |
| Bonding temperature °C. | 110 | 110 |
| Type failure | None | None |
| Grindability | Excellent | Excellent |
| Coating weight g/yd$^2$ | 20 | 21 |
| Crystallization half time | 2 min. | 0.2 min. |
| Example No. | 15 | |
| Molar proportions of acid and glycol components in copolyester | 70% trans 1,4-cyclohexanedicarboxylate<br>30% dimethyl terephthalate<br>80% 1,4-butanediol<br>20% ethylene glycol | |
| Inherent viscosity | 1.0 | |
| $\Delta H_f$ cal/g (DSC) | 5.16 | |
| T-peel strength at 23° C. lb/in. | 2.2 | |
| T-peel strength after dry cleaning (5 cycles) lb/in. | 2.2 | |
| Melting point (DSC) °C. | 143 | |
| Bonding temperature °C. | 150 | |
| Type failure | Will not bond at 110° C. | |
| Grindability | Excellent | |
| Coating weight g/yd$^2$ | 20 | |
| Crystallization half time | 1 min. | |

Unless otherwise specified, all parts, percentages, ratios, etc., are by weight.

The invention has been described in detail with particular reference to preferred embodiments thereof, but it will be understood that variations and modifications can be effected within the spirit and scope of the invention.

I claim:

1. A crystalline copolyester derived from 100 mole % of a dibasic acid component and 100 mole % of a glycol component, said dibasic acid component comprising at least 40 mole % of 1,4-cyclohexanedicarboxylic acid at least 80% of which is the trans-isomer, and said glycol component comprising at least 50 mole % 1,4-butanediol, said copolyester characterized by having a melting point of about 40°–130° C., a glass transition temperature of about −20° C. to about 40° C., a heat of fusion of greater than 1.0 calorie per gram, and a crystalline half time of less than 10 minutes at maximum crystallization temperature.

2. A copolyester according to claim 1 wherein said dibasic acid component comprises up to about 60 mole % of a second acid selected from the group consisting of isophthalic, succinic, adipic and glutaric.

3. A copolyester according to claim 1 wherein said glycol component comprises up to about 50 mole % of ethylene glycol, diethylene glycol or mixtures thereof.

4. A copolyester according to claim 3 wherein said glycol component comprises ethylene glycol.

5. A copolyester according to claim 3 wherein said glycol component comprises diethylene glycol.

6. A copolyester according to claim 1 wherein said acid component comprises 1,4-cyclohexanedicarboxylic and glutaric acid and said glycol component comprises 1,4-butanediol and diethylene glycol.

7. A copolyester according to claim 1 wherein said acid component comprises 1,4-cyclohexanedicarboxylic and glutaric acid and said glycol component comprises 1,4-butanediol and ethylene glycol.

8. A copolyester according to claim 1 wherein the inherent viscosity is between about 0.4 and about 1.2.

9. A copolyester according to claim 1 in the form of a powder.

10. A crystalline copolyester adhesive composition derived from 100 mole % of a dibasic acid component and 100 mole % of a glycol component, said dibasic acid component comprising at least 40 mole % of 1,4-cyclohexanedicarboxylic acid and up to 60 mole % of at least one other acid selected from the group consisting of isophthalic, terephthalic succinic, adipic and glutaric, and said glycol component comprising at least 50 mole % 1,4-butanediol and up to 50 mole % of at least one other glycol selected from the group consisting of ethylene glycol and diethylene glycol, said copolyester characterized by having a melting point of about 40°–130° C., a glass transition temperature of about −20° C. to about 40° C., a heat of fusion of greater than 1.0 calorie per gram, and a crystalline half time of less than 10 minutes at maximum crystallization temperature.

11. A fabric having the copolyester according to claim 1 adhered thereto.

12. A fabric having the copolyester according to claim 10 adhered thereto.